US008538910B2

(12) United States Patent
Minka et al.

(10) Patent No.: US 8,538,910 B2
(45) Date of Patent: Sep. 17, 2013

(54) DETERMINING RELATIVE SKILLS OF PLAYERS

(75) Inventors: Thomas Minka, Cambridge (GB); Thore K H Graepel, Cambridge (GB); Ralf Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 12/278,387

(22) PCT Filed: Jan. 16, 2007

(86) PCT No.: PCT/US2007/001096
§ 371 (c)(1),
(2), (4) Date: Aug. 12, 2008

(87) PCT Pub. No.: WO2007/094909
PCT Pub. Date: Aug. 23, 2007

(65) Prior Publication Data
US 2009/0227313 A1    Sep. 10, 2009

(30) Foreign Application Priority Data
Feb. 10, 2006  (EP) .................................... 06270014

(51) Int. Cl.
*G06F 15/18*     (2006.01)
*G06F 17/00*     (2006.01)
*G06N 5/04*      (2006.01)

(52) U.S. Cl.
USPC .................. 706/61; 700/90; 700/91; 700/92; 715/201; 715/730

(58) Field of Classification Search
None
See application file for complete search history.

(56) References Cited

U.S. PATENT DOCUMENTS

| 5,221,082 A | 6/1993 | Curshod |
| 5,830,064 A | 11/1998 | Bradish et al. |
| 5,853,324 A | 12/1998 | Kami et al. |
| 5,916,024 A | 6/1999 | Von Kohorn |
| 6,074,312 A | 6/2000 | Lyon et al. |

(Continued)

FOREIGN PATENT DOCUMENTS

| EP | 1862955 A1 | 12/2007 |
| JP | 2000508940 A | 7/2000 |

(Continued)

OTHER PUBLICATIONS

David Heckerman, "A Tutorial on Learning With Bayesian Networks", Mar. 1995, Microsoft Research, pp. 1-57.*

(Continued)

*Primary Examiner* — Kakali Chaki
*Assistant Examiner* — Luis Sitiriche
(74) *Attorney, Agent, or Firm* — Zete Law, P.L.L.C.; MacLane C. Key

(57) ABSTRACT

There is a desire to provide a way to determine relative skills of players of games such as computer games, chess, tennis and any other suitable type of game. Our earlier Bayesian Scoring system is implemented in Xbox Live (trade mark) and is currently commercially available under the trade name TrueSkill (trade mark). Here we build on our earlier work and use a new method of computation to enable processing times to be significantly reduced. Message passing techniques are adapted to enable computation of updated skill beliefs to be obtained quickly even in the case of multiple teams of multiple players.

20 Claims, 20 Drawing Sheets

(56) References Cited

U.S. PATENT DOCUMENTS

| | | | |
|---|---|---|---|
| 6,174,237 B1* | 1/2001 | Stephenson | 463/42 |
| 6,267,687 B1 | 7/2001 | Alex | |
| 6,443,838 B1 | 9/2002 | Jaimet | |
| 6,468,155 B1 | 10/2002 | Zucker et al. | |
| 6,523,828 B2 | 2/2003 | Lorenzin | |
| 6,801,810 B1 | 10/2004 | Poncet | |
| 6,824,462 B2 | 11/2004 | Lydon et al. | |
| 6,840,861 B2 | 1/2005 | Jordan et al. | |
| 6,996,444 B2 | 2/2006 | Ach, III | |
| 7,050,868 B1* | 5/2006 | Graepel et al. | 700/93 |
| 7,376,474 B2 | 5/2008 | Graepel et al. | |
| 7,793,205 B2* | 9/2010 | Errico et al. | 715/201 |
| 7,840,288 B2 | 11/2010 | Graepel et al. | |
| 7,846,024 B2 | 12/2010 | Graepel et al. | |
| 2002/0068592 A1 | 6/2002 | Hutcheson et al. | |
| 2002/0115488 A1 | 8/2002 | Berry et al. | |
| 2002/0116325 A1 | 8/2002 | Wise et al. | |
| 2003/0073472 A1 | 4/2003 | Varley | |
| 2003/0158827 A1* | 8/2003 | Ansari et al. | 706/12 |
| 2004/0059655 A1 | 3/2004 | Seifert et al. | |
| 2004/0083078 A1 | 4/2004 | Feldman | |
| 2004/0225387 A1 | 11/2004 | Smith, III | |
| 2005/0087926 A1 | 4/2005 | Hattori | |
| 2005/0192097 A1 | 9/2005 | Farnham et al. | |
| 2005/0233791 A1 | 10/2005 | Kane | |
| 2006/0178765 A1 | 8/2006 | Graepel et al. | |
| 2006/0184260 A1 | 8/2006 | Graepel et al. | |
| 2007/0026934 A1 | 2/2007 | Herbrich et al. | |
| 2007/0112706 A1 | 5/2007 | Herbrich et al. | |
| 2007/0129133 A1 | 6/2007 | Bansemer et al. | |
| 2007/0166680 A1* | 7/2007 | Shibata et al. | 434/247 |
| 2007/0191110 A1 | 8/2007 | Crouse | |
| 2009/0227313 A1 | 9/2009 | Minka et al. | |

FOREIGN PATENT DOCUMENTS

| | | | |
|---|---|---|---|
| JP | 2000262766 A | 9/2000 | |
| JP | 2001526550 A | 12/2001 | |
| JP | 2002035432 A | 2/2002 | |
| JP | 2002140455 A | 5/2002 | |
| JP | 2003117243 A | 4/2003 | |
| JP | 2004209299 A | 7/2004 | |
| JP | 2006204921 A | 8/2006 | |
| KR | 1020000053909 | 9/2000 | |
| KR | 20010069675 | 7/2001 | |
| KR | 20020003634 | 1/2002 | |
| KR | 20050095667 A | 9/2005 | |
| WO | WO02077897 A1 | 10/2002 | |
| WO | WO2004017178 A2 | 2/2004 | |
| WO | WO2007094909 A1 | 8/2007 | |

OTHER PUBLICATIONS

Winn, John M. "Variational Message Passing and its Applications", St. John's College, Cambridge, Jan. 2004, pp. 1-149.

Commencement of Proceedings before the Board of Appeal dated Jan. 19, 2010 from EP 1862955.

Decision to refuse a European Patent application dated Nov. 11, 2009 from EP 1862955, 23 pages.

EP Notice of Appeal filed Dec. 17, 2009 for EP 1862955, 1 page.

EP Office Action for EP patent application EP 1862955 dated Jul. 11, 2008, 1 page.

EP Office Action response filed Aug. 6, 2009 for EP 1862955, 7 pages.

Grounds of Appeal filed Dec. 22, 2009 with the EOP for EP 1862955, 7 pages.

Response filed Dec. 30, 2008 to EP Office Action for EP application 1862955, 11 pages.

International Preliminary Report dated Aug. 21, 2008 for PCT/US2007/001096, 9 pages.

EPO Result of Consultation dated Jul. 1, 2009 from EP 1862955, 3 pages.

International Search Report and Written Opinion for PCT/US2007/001096, mailed Jul. 9, 2007, 12 pages.

Summon to Oral Proceedings dated May 8, 2009 from EP patent application 1862955, 4 pages.

Allen, et al., "Collective Choice: Competitive Ranking Systems", available at least as early as Aug. 8, 2007, at <<http://www.lifewithalacrity.com/2006/01/ranking_systems.html>>, pp. 18.

Translation of Office Action for Chinese Patent Application CN 200680043271.9 dated Mar. 23, 2011.

Translation of Office Action for Chinese Patent Application CN 200680043271.9 dated Aug. 11, 2010.

David, et al., "The Method of Paired Comparisons", pp. 1386-1387, 1963.

Edwards, "Edo Historical Chess Ratings", at <<http://members.shaw.ca/edo1/>>, pp. 30.

Herbrich, et al., "TrueSkill(TM): A Bayesian Skill Rating System", Jun. 2006, pp. 10.

Knies, "TrueSkill: Matchmaking Made Easy for Xbox Live", at <<http://research.microsoft.com/displayArticle.aspx?id=1361>>, Microsoft Corporation, 2007, pp. 2.

Perry, "Live in the Next Generation: The TrueSkill System", at <<http://uk.xbox360.ign.com/articles/662/662347p1.html>>, IGN Entertainment, Inc., 2007, pp. 2.

Scheid, The Search for the Handicap, 1978 Winter Simulation Conference, vol. 2, Dec. 1978, pp. 889-896.

Sonas, "Chessmetrics", at <<http://db.chessmetrics.com/>>, Mar. 26, 2005, pp. 2.

"The Details of the TrueSkill Ranking System", at <<http://research.microsoft.com/mlp/trueskill/Details.aspx>>, Microsoft Corporation, 2007, pp. 3.

CN Patent Application 200780005036.7; Office Action dated Dec. 31, 2010 (and English translation), 10 pages.

CN Patent Application 200780005935.7; Office Action dated Mar. 23, 2011 (and English translation), 68 pages.

Office Action from the U.S. Patent and Trademark Office for U.S. Appl. No. 11/540,195, mailed on Jun. 21, 2011, 9 pages.

Office Action from US Patent and Trademark Office for U.S. Appl. No. 11/540,195, mailed Jul. 15, 2010, 7 pages.

Genz, "Numerical Computation of Multivariate Normal Probabilities," Journal of Computational and Graphical Statistics 1, 1992, pp. 141-149.

Glickman, Example of the Glicko-2 System, retrieved from <<http://www.glicko.net/glicko/glicko2.pdf>> on Dec. 13, 2011, 5 pages.

Glickman, "Parameter Estimation in Large Dynamic paired Comparison Experiments," Applied Statistics, vol. 48, 1999, pp. 377-394.

Glickman, The Glicko System, retrieved at <<http://www.glicko.net/glicko/glicko.pdf>> on Dec. 13, 2011, 5 pages.

Wikipedia article on "Handicap Golf" retrieved from <<http://en.wikipedia.org/wiki/Handicap_(golf)>> on Dec. 5, 2011.

International Search Report & Written Opinion for PCT/US2006/045159, mailed Apr. 16, 2007, 8 pages.

English translation of Office Action for Japanese Patent Application 2006-015483 mailed on Feb. 23, 2007, 4 pages.

Translation of a Office Action for Japanese Patent Application JP 2006-015483, mailed on Jan. 29, 2008, 1 page.

English translation of Office Action for Japanese Patent Application JP2006-015483, dated Sep. 18, 2007, 2 pages.

Minka, "A family of algorithms for approximate Bayesian inference," Ph. D Thesis, Jan. 2001, Massachusetts Institute of Technology, Boston, MA pp. 1-75.

Mitchell et al., "Six in the City: Introducing Real Tournament—A Mobile IPv6 Based Context-Aware Multiplayer Game," Network and System Support for Games, 2003, pp. 91-100.

Office Action from U.S. patent and Tradmark Office for U.S. Appl. No. 11/540,195, mailed Feb. 11, 2011, 7 pages.

Office Action from the U. S. Patent and Trademark Office for U.S. Appl. No. 11/540,195, mailed on Mar. 26, 2010, 8 pages.

International Search Report and Written Opinion for PCT/US2007/001096 dated Jul. 9, 2007, 12 pages.

PCT/US2007/004136 dated Jul. 19, 2007, 10 pages.
Shehory et al., "Multi-Agent Coalition Re-Formation and League Ranking," Autonomous Agents and Multiagent Systems Conference, vol. 3, 2004, pp. 1346-1347.
Shehory, et al., Multi-Agent Coalition Re-Formation and League Ranking, (AAMAS) Autonomous Agents and Multiagent Systems Conference, vol. 3, Jul. 2004, 2 pages.
U.S. Appl. No. 11/540,195, filed Sep. 29, 2006, Ralf Herbrich.

Wikipedia, ELO rating system, retrieved on Sep. 20, 2011 at <<http://web.archive.org/web/20040314170254/http://en.wikipedia.org/wiki/ELO_rating_system>> available as early as Mar. 14, 2004, pp. 1-5.
Winn, "Variational Message Passing and its Applications," St. John's College, Cambridge, UK, Jan. 2004, pp. 1-149.

* cited by examiner

DETERMINING RELATIVE SKILLS OF PLAYERS

RELATED APPLICATIONS

This application is a National Stage of International Application No. PCT/US2007/001096, filed 16 Jan. 2007, which claims priority from European Patent Application No. 06270014.1, filed on 10 Feb. 2006. Both applications are incorporated herein by reference.

TECHNICAL FIELD

This description relates generally to determining relative skills of players of a game such as a computer game or any other type of game. It is particularly related to, but in no way limited to, using Bayesian statistical techniques to rank players on the basis of outcomes of a plurality of games involving those players.

BACKGROUND

There is a desire to provide a way to determine relative skills of players of games such as computer games, chess, tennis, and any other type of game. This needs to be achieved in a manner whereby the indication of relative skill is as accurate as possible and also is understood and accepted by end users (i.e. game players). In addition the relative skills need to be determined quickly even in the case of games involving many players and also in the case of many teams of players, each team having many members. This is particularly problematic because in these situations, computational complexity typically increases significantly. Players can be human players or computer programs.

In our earlier US patent application filed on 24 Jan. 2005 entitled "Bayesian Scoring", we describe a system for ranking or determining an indication of the skill of a player based on the outcome of a game. The skill levels may be used to track a player's progress and/or standing in the gaming environment, and/or may be used to match players with each other for a future game. We describe a system using Bayesian statistical techniques to determine the indications of player relative skill. The present invention builds on and extends our earlier work and in particular provides a new computational method which enables computation times to be reduced.

A previous ranking system for games has been proposed which uses a statistical approach. The ELO ranking system, devised by Arpad Elo, is suitable for two-player games only. However, it is required to provide a system which works for game modes with more than two players per match.

The present invention seeks to provide an improved method and apparatus for determining an indication of the relative skill of players of a game which overcomes or at least mitigates one or more of the problems noted above.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a method of determining an indication of the relative skill of at least a first player and a second player of a game based on the outcome of one or more such games involving those players. The method comprising the steps of:

for each player, accessing statistics describing a probability distribution associated with belief about skill of that player;
receiving information about the outcome of one of the games;
forming a factor graph comprising nodes, said graph being formed using the received information about the outcome, and instantiating at least some of the nodes with the statistics; and
updating the statistics associated with each player by using message passing techniques over the factor graph.

A corresponding apparatus is provided. The apparatus is for determining an indication of the relative skill of at least a first player and a second player of a game based on the outcome of one or more such games involving those players said apparatus comprising:

an input arranged to access, for each player, statistics describing a probability distribution associated with belief about skill of that player;
an input arranged to receive information about the outcome of one of the games;
means for forming a factor graph comprising nodes, said graph being formed using the received information about the outcome, and instantiating at least some of the nodes with the statistics; and
one or more processors arranged to update the statistics associated with each player by using message passing techniques over the factor graph.

Preferably the statistics comprise at least a mean and a variance describing each probability distribution.

Preferably the probability distributions are Gaussian.

Preferably the factor graph is acyclic.

Preferably the factor graph is composed of two types of nodes and is bi-partite.

Advantageously the message passing techniques applied over the factor graph are arranged to substantially perform Bayesian inference processes.

In a preferred example the factor graph comprises a plurality of groups of nodes, each group being associated with a particular player and comprising nodes linked in series. In another example, the factor graph comprises a plurality of second groups of nodes, each second group being associated with a team of players.

In an example, the method is for determining an indication of the relative skill of three or more players of a game.

In some examples information about the outcome of the game further comprises, for each player, an indication of a length of time that that player participated in the game and wherein the statistics are updated on that basis of that information.

In some examples, information about the outcome of the game comprises a partial ranking of players said partial ranking comprising a rank for at least one player and no rank information for a plurality of other players, and wherein said factor graph is formed such that a link is created between a node associated with the ranked player and a node associated with each of the unranked players.

The examples also include a computer program comprising computer program code means adapted to perform all the steps of any of the methods described when said program is run on a computer. The computer program may be embodied on a computer readable medium.

The method may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Our earlier Bayesian Scoring system is implemented in Xbox Live (trade mark) and is currently commercially available under the trade name TrueSkill (trade mark). The present invention extends and builds on our earlier work and uses a new method of computation to enable processing times to be significantly reduced. A summary of the currently available TrueSkill system is now given to aid understanding of the present invention.

Most games have at their root a metric for judging whether the game's goals have been met. In the case of matches involving two or more players ("multiplayer matches"), this often includes ways of ranking the skills of match participants. This encourages competition between players, both to "win" individual matches, and to have their overall skill level recognised and acknowledged in a broader community. Players may wish to evaluate their skills relative to people they know or relative to potential opponents they have never played, so they can arrange interesting matches. We term a match "uninteresting" if the chances of winning for the participating players are very unbalanced—very few people enjoy playing a match they cannot win or cannot lose. Conversely, matches which have a relatively even chance of any participant winning are deemed "interesting" matches.

The TrueSkill ranking system is a skill-based ranking system that uses a technique called Bayesian inference for ranking players.

Figure 1:
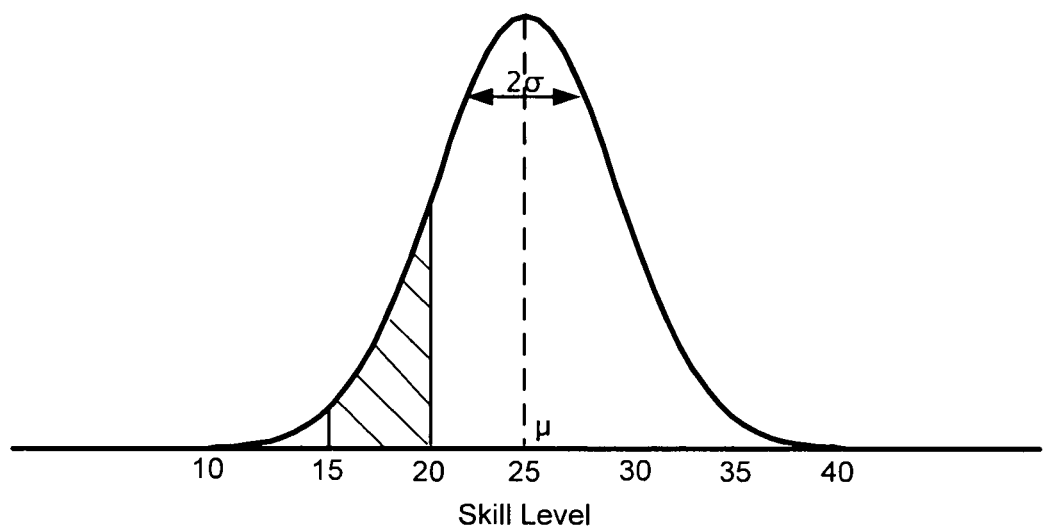
FIG. 1. is an example Gaussian distribution used to represent a skill belief.
Figure 2:
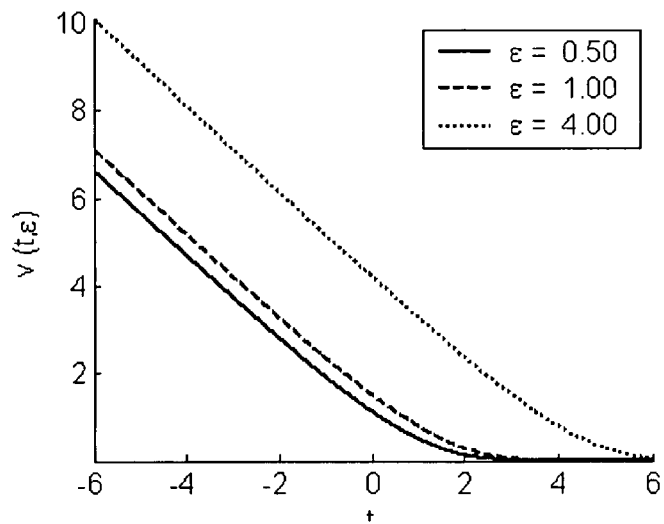
FIG. 2 is a plot of function V for various values of draw margin 8 if the game ends in a win and loss.
Figure 3:
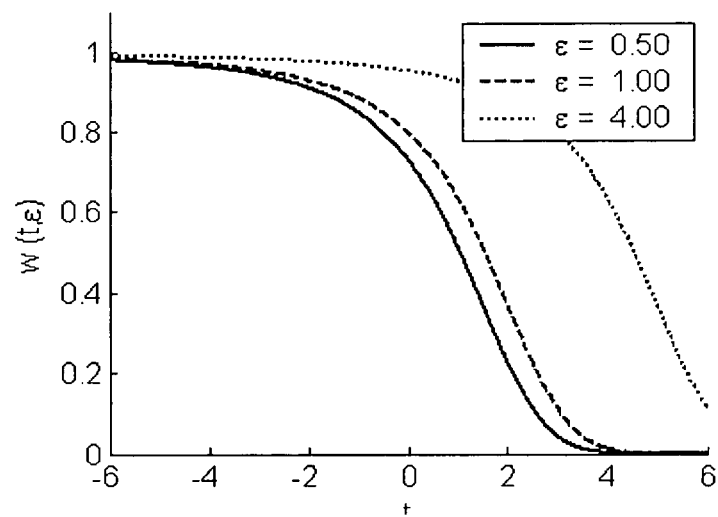
FIG. 3 is a plot of function W for various values of draw margin 8 if the game ends in a win and loss.
Figure 4:
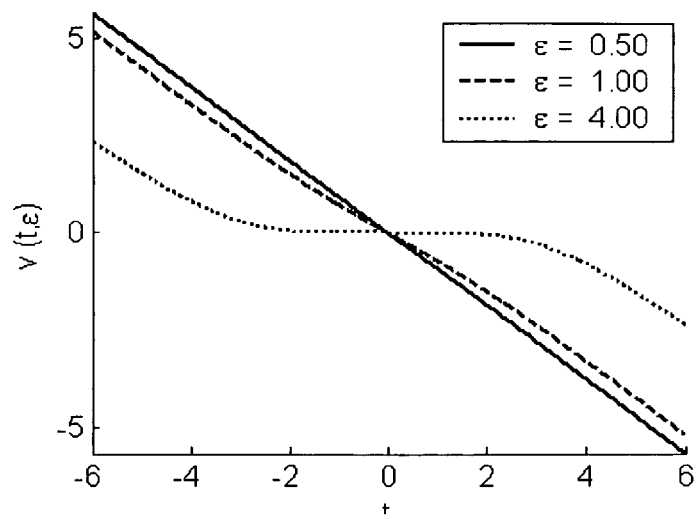
FIG. 4 is a plot of function V for various values of draw margin 8 if the game ends in a draw.
Figure 5:
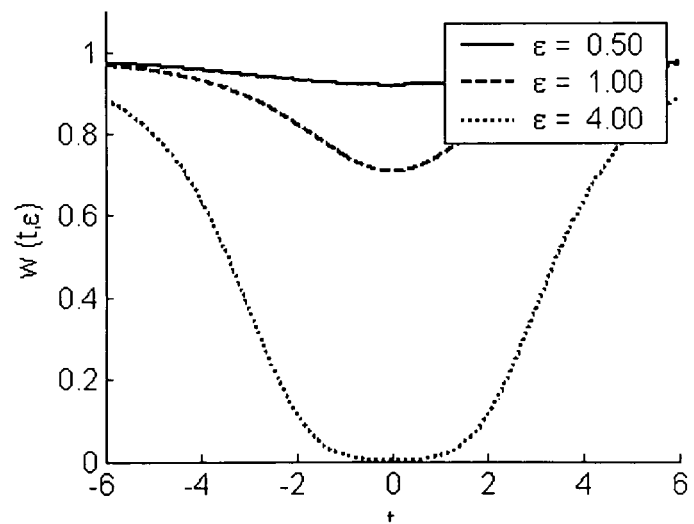
FIG. 5 is a plot of function W for various values of draw margin 8 if the game ends in a draw.

Rather than assuming a single fixed skill for each player, the system characterises its belief using a bell-curve belief distribution (also referred to as Gaussian) which is uniquely described by its mean $\mu$ and standard deviation $\sigma$. An exemplary belief distribution is shown in FIG. 1. Note that the area under the skill belief distribution curve within a certain range corresponds to the belief that the player's skill will lie in that range. For example, the shaded area in FIG. 1 represents the belief that the player's skill is within level 15 and 20. As the system learns more about a player's skill, $\sigma$ has the tendency to become smaller, more tightly bracketing that player's skill. Another way of thinking about the $\mu$ and $\sigma$ values is to consider them as the "average player skill belief" and the "uncertainty" associated with that assessment of their skill.

Since the TrueSkill ranking system uses a Gaussian belief distribution to characterise a player's skill, all mean skills (that is, $\mu$'s) will always lie within ±4 times the initial $\sigma$ (more precisely with probability 99.99%).

The TrueSkill ranking system can do all calculations using an initial uncertainty of 1, because then $\mu$ and $\sigma$ can be scaled to any other range by simply multiplying them. For example, suppose all calculations are done with an initial $\mu$ of 3 and $\sigma$ of 1. If one wishes to express player's skill as one of 50 "levels", multiply $\mu$ and $\sigma$ by 50/6=8.3 because almost all $\mu$ happen to be within ±3 times the initial $\sigma$.

The intuition is that the greater the difference between two player's $\mu$ values—assuming their $\sigma$ value are similar—the greater the chance of the player with the higher $\mu$ value performing better in a game. This principle holds true in the TrueSkill ranking system. But, this does not mean that the players with the larger $\mu$'s are always expected to win, but rather that their chance of winning is higher than that of the players with the smaller $\mu$'s. The TrueSkill ranking system assumes that the performance in a single match is varying around the skill of the player, and that the game outcome (relative ranking of all players participating in a game) is determined by their performance. Thus, the skill of a player in the TrueSkill ranking system can be thought of as the average performance of the player over a large number of games. The variation of the performance around the skill is, in principle, a configurable parameter of the TrueSkill ranking system.

The TrueSkill ranking system will base its update of $\mu$ and $\sigma$ on the game outcome (relative ranking of all teams) only; it merely assumes that the outcome is due to some unobserved performance that varies around the skill of a player. If one is playing a point based game and the winner beats all the other players by a factor of ten, that player's victory will be scored no differently than if they had only won by a single point. Every match provides the system with more information about each player's skill belief, usually driving σ down.

Before starting to determine the new skill beliefs of all participating players for a new game outcome, the TrueSkill ranking system assumes that the skill of each player may have changed slightly between the current and the last game played by each player. The mathematical consequence of making such an assumption is that the skill uncertainty σ will be slightly increased, the amount of which is, in principle, a configurable parameter of the TrueSkill ranking system. It is this parameter that both allows the TrueSkill system to track skill improvements of gamers over time and ensures that the skill uncertainty σ never decreases to zero ("maintaining momentum").

In order to determine the new skill beliefs of all the participating players for a new game outcome, the TrueSkill ranking system needs to determine the probability of the observed game outcome for given skills of the participating players and weight it by the probability of the corresponding skill beliefs. This is done by averaging over all possible performances (weighted by their probabilities) and deriving the game outcome from the performances: The player with the highest performance is the winner; the player with the second highest performance is the first runner up, and so on. If two players' performances are very close together, then the TrueSkill ranking system considers the outcome between these two players a draw. The larger the margin which defines a draw in a given league, the more likely a draw is to occur, according to the TrueSkill ranking system. The size of this margin is a configurable parameter of the TrueSkill ranking system and is adjusted based on the game mode. For example, a street race in Project Gotham Racing 3 (trade mark) can never end in a draw (thus the parameter is set to zero) whereas a Capture-the-Flag game in Perfect Dark Zero (trade mark) can easily end in a draw.

By virtue of the above weighting technique (which is based on Bayes' Law), the system arrives at a new skill belief for every player participating in the game. These skill beliefs are not Gaussian anymore. Hence, the TrueSkill ranking system determines the best Gaussian approximation. As a result, given players' μ values increase for each opponent they outperformed, and decreases for each opponent they lost against.

The simplest case for an TrueSkill ranking system update is a two-person match. Suppose we have players A(lice) and B(ob), with μ and σ values ($\mu_A$, $\sigma_A$) and ($\mu_B$, $\sigma_B$), respectively. Once the game has finished, the update algorithm determines the winner (Alice or Bob) and loser (Bob or Alice) and applies the following update equations:

$$\mu_{winner} \leftarrow \mu_{winner} + \sigma^2_{winner}/c \cdot v((\mu_{winner}-\mu_{loser})/c, \epsilon/c)$$

$$\mu_{loser} \leftarrow \mu_{loser} - \sigma^2_{loser}/c \cdot v((\mu_{winner}-\mu_{loser})/c, \epsilon/c)$$

$$\sigma^2_{winner} \leftarrow \sigma^2_{winner} \cdot [1 - \sigma^2_{winner}/c^2 \cdot w((\mu_{winner}-\mu_{loser})/c, \epsilon/c)]$$

$$\sigma^2_{loser} \leftarrow \sigma^2_{loser} \cdot [1 - \sigma^2_{loser}/c^2 \cdot w((\mu_{winner}-\mu_{loser})/c, \epsilon/c)]$$

$$c^2 = 2\beta^2 + \sigma^2_{winner} + \sigma^2_{loser}$$

In these equations, the only unknown is $\beta^2$ which is the variance of the performance around the skill of each player. Moreover, ε is the aforementioned draw margin which depends on the game mode. The functions v(.,.) and w(.,.) are given by $$v(t, \alpha) = \frac{N(t-\alpha)}{\Phi(t-\alpha)}$$

$$w(t, \alpha) = v(t, \alpha) \cdot (v(t, \alpha) - (t-\alpha))$$

if the game ends in win and loss or $$v(t, \alpha) = \frac{N(-\alpha-t) - N(\alpha-t)}{\Phi(\alpha-t) - \Phi(-\alpha-t)}$$

$$w(t, \alpha) = v^2(t, \alpha) + \frac{(\alpha-t)N(\alpha-t) - (-\alpha-t)N(-\alpha-t)}{\Phi(\alpha-t) - \Phi(-\alpha-t)}$$

if the game ends in a draw. Where the symbols N and Φ represent the density of the Gaussian distribution function and the cumulative distribution function of the Gaussian, respectively. The symbols t and β are simply arguments to the functions. Any suitable numerical or analytic methods can be used to evaluate these functions such as those described in Press et al., Numerical Recipes in C: the Art of Scientific Computing (2d. ed.), Cambridge, Cambridge University Press, ISBN-0-521-43108-5. Plots of these functions obtained using numerical integration, for varying values of ε/c are given in FIGS. 2 to 5.

There are a few observations about these update equations:
Similarly to the ELO system, in the mean skill update equation the winner gets a multiple of $v((\mu_{winner}-\mu_{loser})/c, \epsilon/c)$ added to the mean skill and the loser gets a multiple of $v((\mu_{winner}-\mu_{loser})/c, \epsilon/c)$ subtracted from the mean skill. The weighting factors are roughly proportional to the uncertainty of the winner/loser vs. the total sum of uncertainties ($2\beta^2$ is the uncertainty due to the performance variation around the skill and $\sigma^2_{winner} + \sigma^2_{loser}$ is the uncertainty about their true skills). Note that the TrueSkill ranking system's update equation for the mean skill is thus not guaranteed to be zero sum.

The uncertainty of both players (regardless of win/loss/draw) is going to decrease by the factor $1-\sigma^2_{winner}/c^2 \cdot w((\mu_{winner}-\mu_{loser})/c, \epsilon/c)$. Again, the player with the larger uncertainty gets the bigger decrease.

The change in the mean skill, $v((\mu_{winner}-\mu_{loser})/c, \epsilon/c)$, and the decrease factor in the uncertainty, $1-\sigma^2_{winner}/c^2 \cdot w((\mu_{winner}-\mu_{loser})/c, \epsilon/c)$, are close to zero if the game outcome was not surprising.

Win/Loss If the winner had the much bigger mean skill relative to the total uncertainty (thus ($\mu_{winner} - \mu_{loser}$)>ε) then a win cannot buy the winner extra mean skill points or remove any uncertainty. The opposite is true if the game outcome was surprising: If the winner had the smaller mean skill ($\mu_{winner} - \mu_{loser}$)<ε), mean points proportional to $\mu_{loser} - \mu_{winner}$ get added/subtracted to/from the winner/loser.

Draw If both player had similar mean skills upfront (thus $|\mu_{winner} - \mu_{loser}| < \epsilon$) then both players are already close enough together and no mean skill point update needs to be made; hence the uncertainty is not reduced. However, if one player was thought to be much stronger by the TrueSkill ranking system before the game (let's say, $\mu_{winner} - \mu_{loser} > \epsilon$) then his mean skill will be decreased and the other player's mean skill will be increased which, in effect, brings their two mean skill closer together.

In the case of a team match the team's skill is assumed to be a function of the skills of the players. In a preferred embodiment, this function is the sum. The algorithm determines the sum of the skills of the two teams and uses the above two equations where ($\mu_{winner}$, $\sigma^2_{winner}$) and ($\mu_{loser}$, $\sigma^2_{loser}$) are the mean skills and skill variances of the winning and losing team, respectively.

The update equations for more than two teams require numerical integration. In this case the TrueSkill ranking system iterates two team update equations between all teams on neighbouring ranks, that is, the 1st versus the 2nd team, the 2nd team versus the 3rd team and so on. The computational complexity increases cubically for more than two teams as a result of the numerical integration required for the V and W functions. In the present invention we address this by using factor graphs with message passing techniques to reduce the computation required in multi-team situations.

Figure 6:
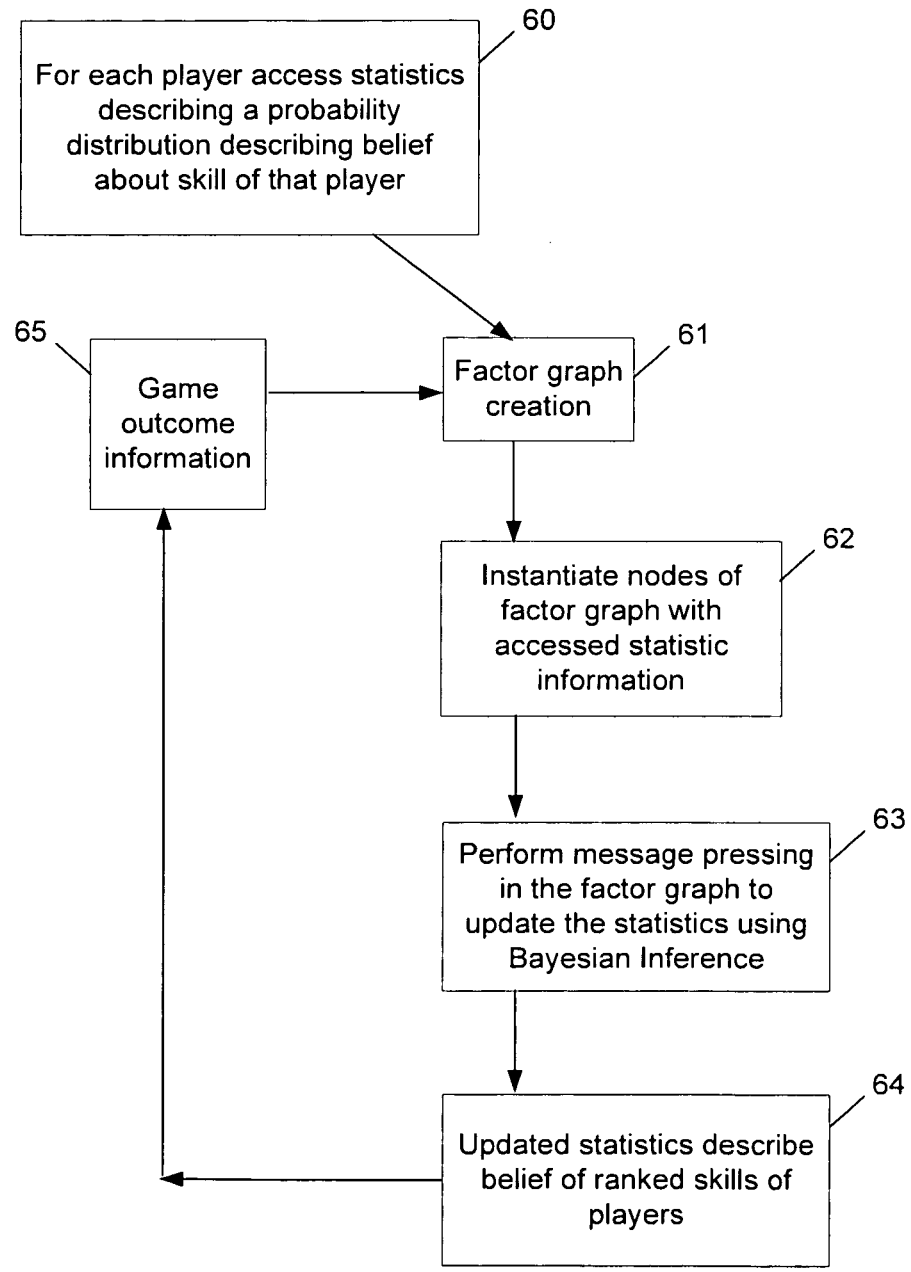
FIG. 6 is a flow diagram of a method of determining an indication of relative skill of players of a game.

With reference to FIG. 6. an example of our method for determining an indication of relative skill of game players is described. The method involves, for each player, accessing statistics (see box 60 of FIG. 6) describing a probability distribution that itself describes our belief about skill of that player. In a preferred embodiment we use one dimensional Gaussian distributions to represent skill belief. For example, FIG. 1 shows such an example Gaussian distribution as explained above. By using Gaussian distributions we achieve the advantage that such distributions can be uniquely described by two statistics, the means and standard deviation, as explained above. In addition, the sum of two Gaussian random variables is itself a Gaussian random variable which enables us to simplify our computations. However, it is not essential to use Gaussian distributions to represent skill belief.

If a player has played before and we have stored skill information for that player that information is accessed. In the case of a new player we use a default belief distribution with associated default statistics, for example an initial μ of 3 and σ of 1. Any suitable default belief distribution is used.

Information about the game outcome is obtained (see box 65 of FIG. 6) and this is used to form the factor graph (see box 61) together with the statistics. The factor graph comprises nodes associated with particular players, those nodes being ordered on the basis of any teams and outcomes of the game. Some nodes of the factor graph are instantiated with the accessed statistic information (see box 62). Message passing is then performed over the factor graph to update the statistics using Bayesian Inference (see box 63). The resulting updated statistics describe our belief of the relative skill of the players (see box 64) and the process can be repeated for further games.

Figure 7:
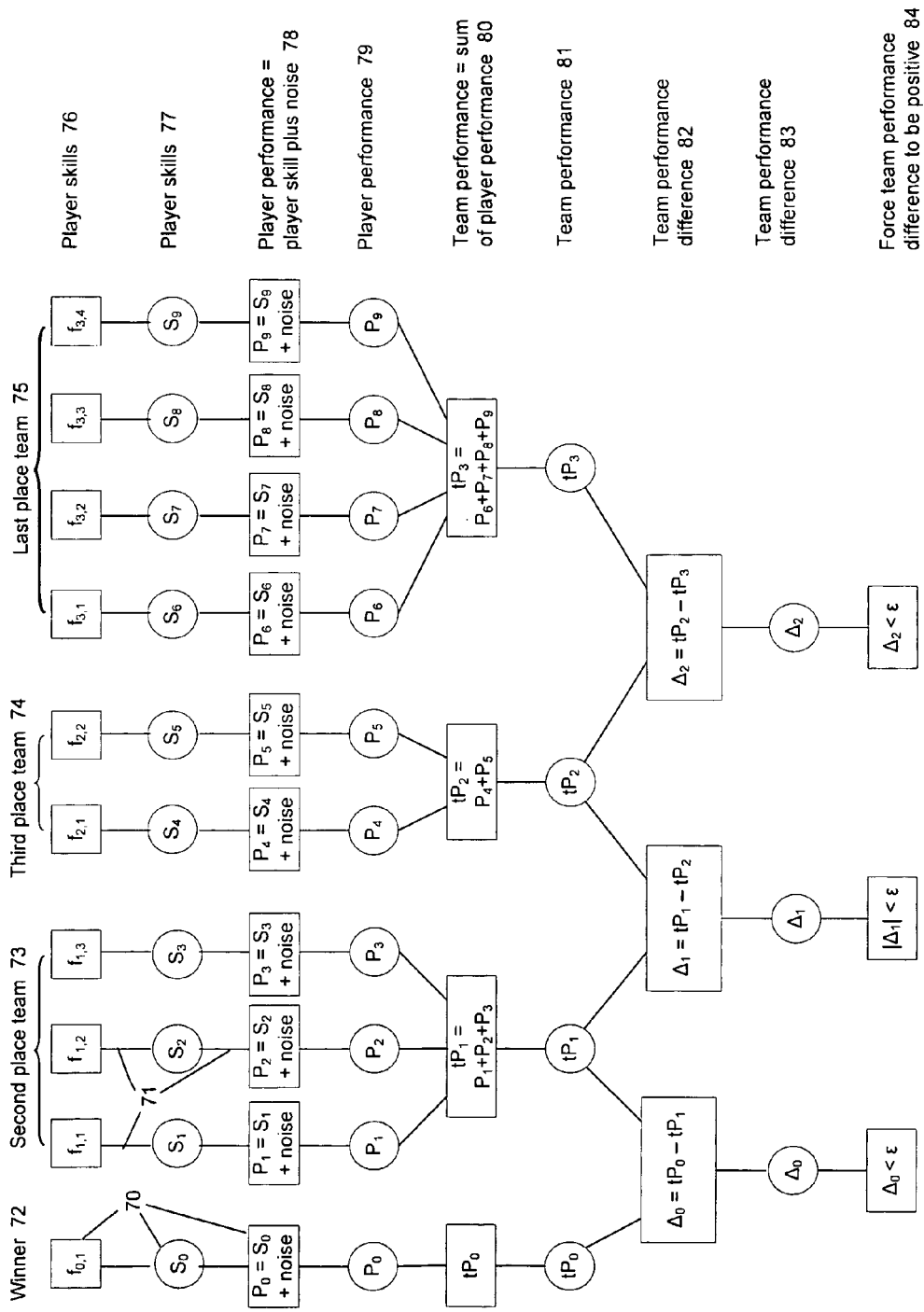
FIG. 7 is an example of a factor graph for a game having four teams.

More detail about the process of forming the factor graph is now given with reference to FIG. 7. The factor graph comprises nodes 70 connected by links 71. The nodes are either variable nodes (circles) or factor nodes (rectangles). Variable nodes represent storage locations and factor nodes represent computational units. The factor nodes read and write information to their neighbouring variable nodes according to calculation rules described later.

Each player is represented by a variable node for their skill connected to a set of nodes which relate to their skill and their performance in the particular game. In FIG. 7, these nodes are drawn in a single column for each player, with players on the same team having nodes in adjacent columns. In the example illustrated in FIG. 7 four teams are represented, the winning team having a single player and being represented by the column on the left side of the page, 72. The team in second place 73 comprises three players, the third place team 74 comprises two players and the last place team 75 comprises four players.

As illustrated in FIG. 7, the factor graph is preferably acyclic. Preferably it comprises two types of nodes, variable nodes and factor nodes, and is bipartite.

The factor nodes at the top of the diagram (row 76) are functions which access a database or other store to obtain belief distributions for each player (or use a default belief distribution in the case of a new player). These computational units feed the parameters describing the player skill belief distributions into the corresponding variable nodes. For example, in the case of Gaussian distributions there would be two parameters (two floating-point numbers) stored in each variable node. The next row of variable nodes, that is, the circular nodes 77 connected in series to the top leaf nodes, represent the player skills. These nodes each store the statistics describing the belief distribution for the associated player. The next row of factor nodes are computation units 78 which compute player performance on the basis of, in this example, player skill plus noise. That is, the skill belief distributions of units 77 are modified by increasing their variance parameters and the results are stored in the row of variable nodes 79 representing player performance. This is a deterministic computation, though it can be thought of as adding noise to the underlying random variables.

In order to obtain a representation of team performance as opposed to individual player performance the columns are combined as indicated in FIG. 7. In the case of the second place team for example, this has three players. The performance of this team is taken to be the sum of the performance of the three players and this is indicated by the rectangular node in row 80. The result of that computation is stored in circular node in row 81. Thus in row 81 there is one node per team rather than one node per player. In the case that Gaussian distributions are used the results of the summing process are also Gaussian distributions.

In a preferred embodiment as illustrated in FIG. 7 noise is added to the performance of each individual player and the player performances are then combined to form team performances. However, this is not essential. It is also possible to combine the player skills first to get a team skill, and then add noise to the team skill to obtain the team performance. The noise can be added to the individual player performances and/or to the combined team performances.

Team performance differences are represented by nodes in row 82 and each is calculated as a difference between certain nodes in the team performance layer 81 as indicated. When the game outcome provides a total ordering of the teams, then differences are calculated between consecutive teams in the ordering. In the case of a draw between teams, the teams which drew are placed in an arbitrary order amongst themselves and differences are calculated between consecutive teams in the ordering. For example, in FIG. 7 if the game outcome here were such that the middle two teams 73, 74 drew then the nodes representing those two teams could be interchanged to produce an equally valid factor graph. Circular nodes in row 83 represent the results of the team performance difference calculation. In the case that Gaussian distributions are used the results of the difference process are also Gaussian distributions.

The bottom nodes in the graph are factor nodes which represent a calculation process encouraging the team performance difference to be greater than the draw margin 8 (if no draw) or less than the draw margin in absolute value (in case of a draw). This is explained in more detail with respect to FIG. 8.

Figure 8:
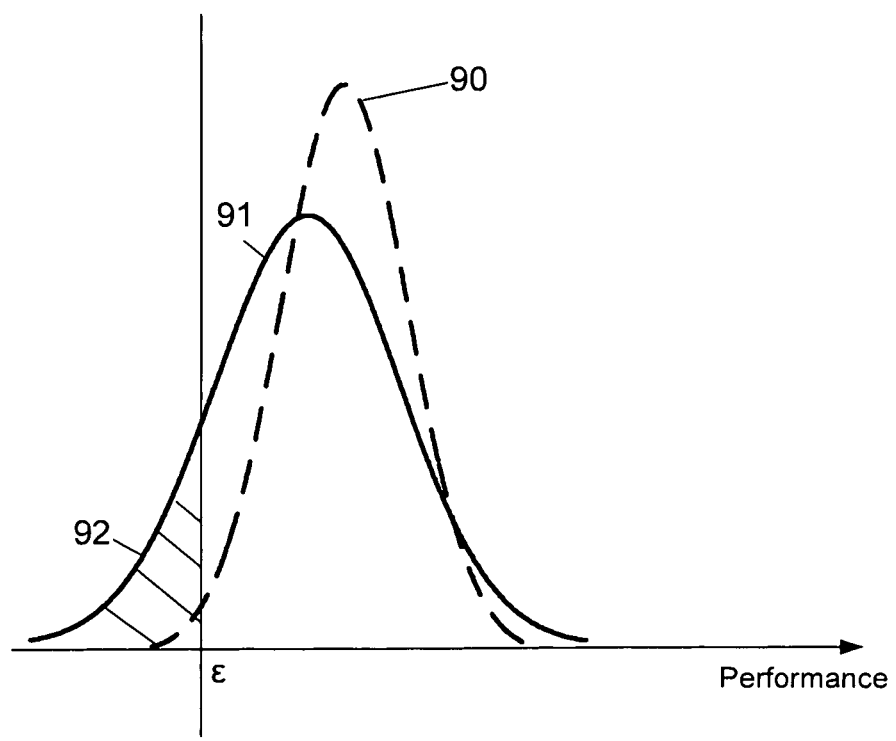
FIG. 8 shows a Gaussian belief distribution before and after application of a process associated with an order node in a factor graph.

FIG. 8 shows a Gaussian distribution (indicated by the solid line curve 91) representing an example belief distribution for team performance difference, for example, as available at a node at row 83 in FIG. 7. This Gaussian distribution is transformed to that indicated by the dotted line 90 in FIG. 8 by an indicator function which encourages the team performance difference to be greater than the draw margin. It can be seen that the Gaussian 91 has a tail extending into a negative region 92 and the transformation produces a Gaussian 90 with only a very small tail in the negative region. The transformed Gaussian is narrower than the initial one 91, that is, has a smaller deviation and its mean is also higher.

The process of message passing comprises carrying out a calculation associated with a computation node (square node in FIG. 7) using distribution parameters from neighbouring variable nodes and passing the results to one of the neighbouring variable nodes (circular nodes in FIG. 7). The direction of passing the results (also referred to as a processing schedule) is explained in more detail now.

Figure 9:
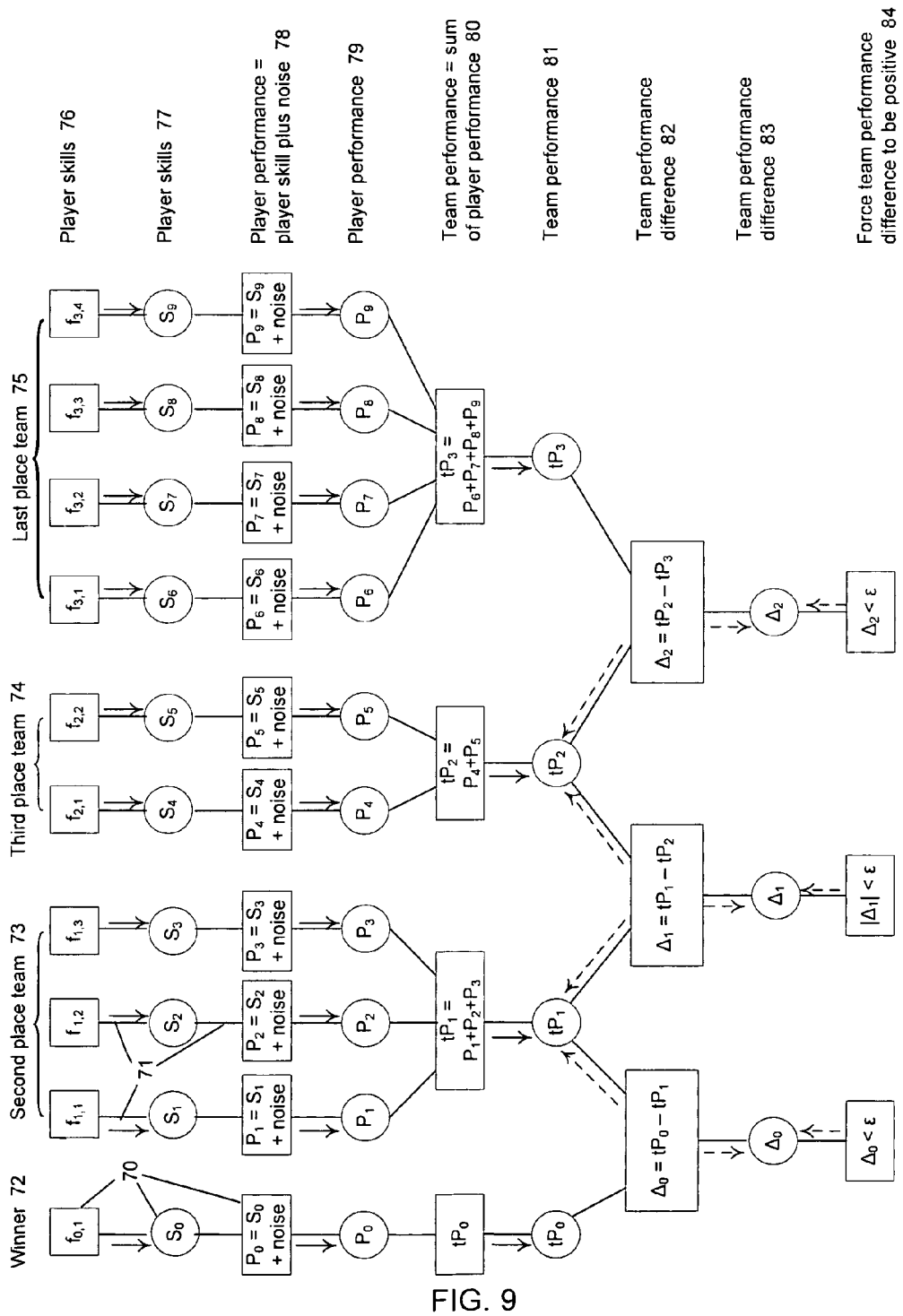
FIG. 9 shows the factor graph of FIG. 7 with arrows indicating scheduling.

The processing schedule is preferably divided into three phases: pre-processing, chain processing, and post-processing. An example pre-processing schedule is illustrated in FIG. 9. Starting at the top factor nodes (row 76), skill distributions are obtained from the database, or are set to default values, and computation proceeds downward along each column until the team performance row is reached (row 81). The post processing schedule is the reverse of the pre-processing schedule but stopping at the player skills in row 77.

After one step of pre-processing, a chain processing schedule is iterated until the belief distributions stop changing. An example chain schedule is indicated in FIG. 8 using dotted arrows. It passes performance belief distributions back and forth between the teams until all of the performance differences satisfy the conditions imposed by the bottom factor nodes. The post-processing phase passes the performance distributions upward to obtain the new player skills. Each arrow in the processing schedules represents a non-trivial calculation and details of those calculations are given below. In the example given in FIG. 7 all the factor nodes (square calculation nodes) are exact factor nodes because they can be computed exactly except for the final indicator function nodes (referred to as order factor nodes). The order factor nodes implement an order constraint and for these nodes the associated update equations are not exact as the true factor-to-variable messages are no longer Gaussian.

We now present general update equations for use in carrying out the computations along the arrows in the message passing process. We tailor those general update equations for use with Gaussian distributions as shown.

Factor Node Update with Gaussian Messages

Figure 10:
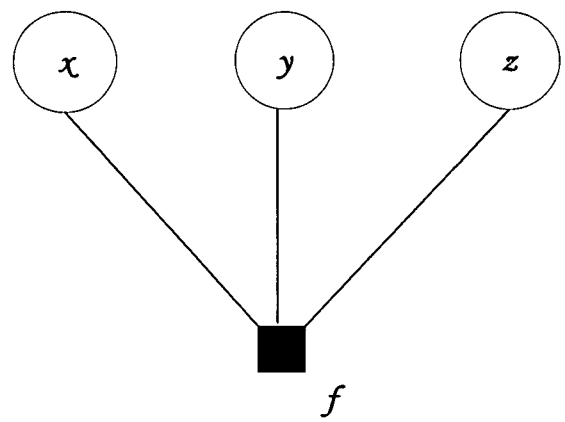
FIGS. 10 to 18 are example factor graphs.
Figure 10:
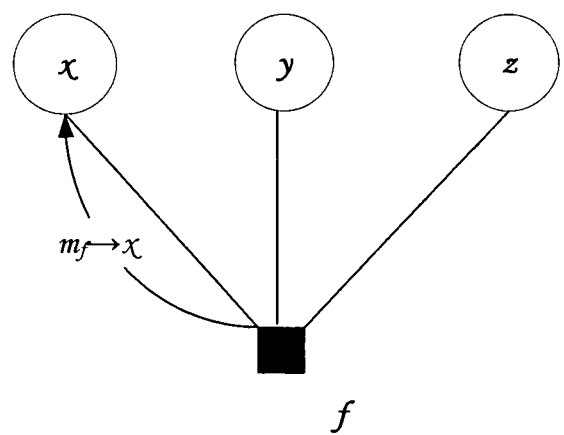

Consider the factor graph of FIG. 10.

Suppose we would like to update the message $m_{f \to x}$ and the marginal $p_x$. Then, the general update equations are as follows:

$$m_{x \to f}(x) \propto \frac{p_x(x)}{m_{f \to x}(x)},$$

$$m_{f \to x}^{true}(x) \propto \int \int f(x, y, z) \cdot \frac{p_y(y)}{m_{f \to y}(y)} \cdot \frac{p_z(z)}{m_{f \to z}(z)} dy dz,$$

$$p_x(x) = MM[m_{f \to x}^{true}(x) m_{x \to f}(x)],$$

$$m_{f \to x}(x) \propto \frac{p_x(x)}{m_{x \to f}(x)},$$

where $MM[\cdot]$ returns the distribution in the Gaussian family with the same moments as the argument and all quantities on the right are normalized to be distributions. In the following we use the exponential representation of the Gaussian, that is, $$G(x;\tau,\pi) \propto \exp(\pi x^2 - 2\tau x)$$

This density has the following relation to the standard density $$G(x; \tau, \pi) := N\left(x; \frac{\tau}{\pi}, \frac{1}{\pi}\right),$$

or $$N(x; \mu, \sigma^2) := G\left(x; \frac{\mu}{\sigma^2}, \frac{1}{\sigma^2}\right)$$

In the case of the exact factor nodes the update equations are given in the following table.

Figure 11:
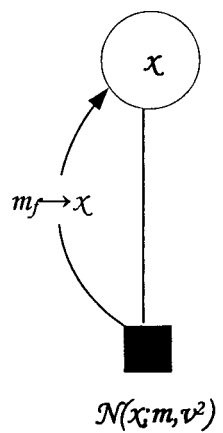
Figure 12:
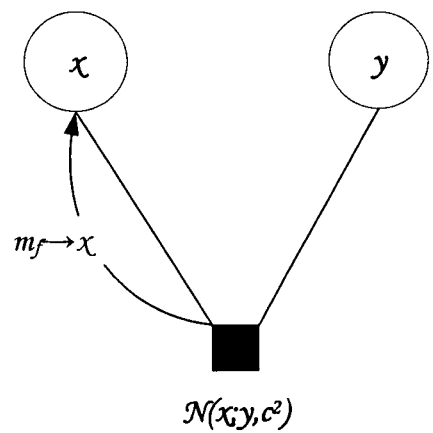
Figure 13:
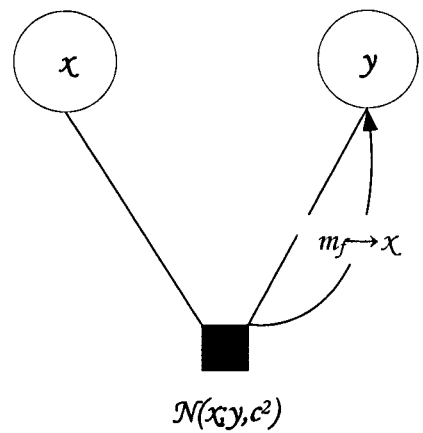
Figure 13:
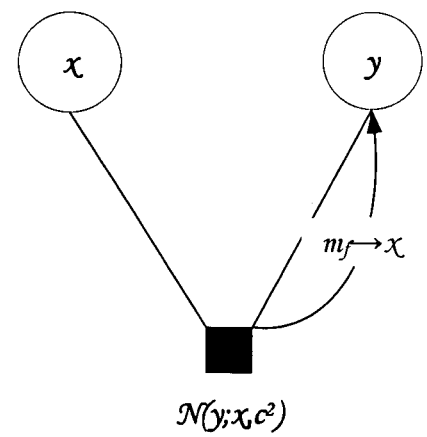
Figure 14:
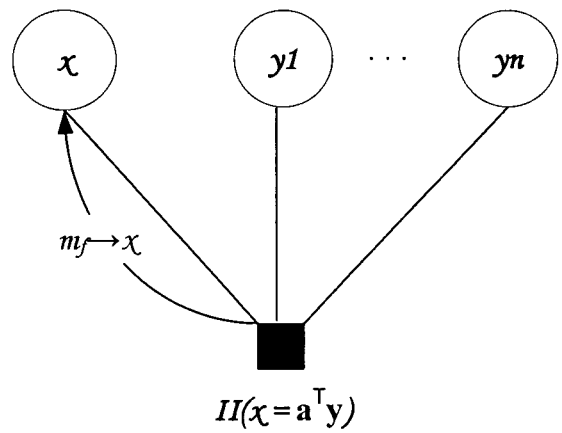
Figure 15:
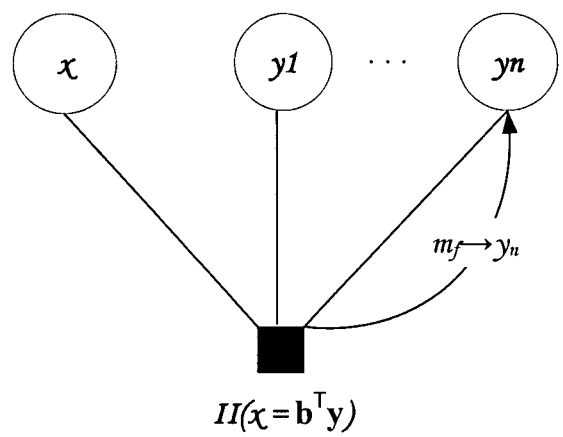
Figure 16:
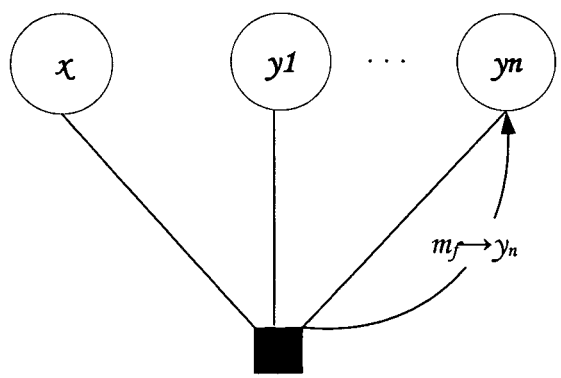

| Factor | Update equation |
|---|---|
| 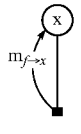<br>$N(x; m, v^2)$<br>Corresponds to FIG. 11 | $\pi_x^{new} \leftarrow \pi_x + \frac{1}{v^2}$<br>$\tau_x^{new} \leftarrow \tau_x + \frac{m}{v^2}$<br>This is exact and should only be executed once. |
| 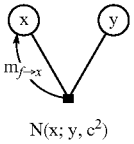<br>$N(x; y, c^2)$<br>Corresponds to FIG. 12 | $\pi_{f \to x}^{new} \leftarrow a(\pi_y - \pi_{f \to y})$<br>$\tau_{f \to x}^{new} \leftarrow a(\tau_y - \tau_{f \to y})$<br>$\pi_x^{new} \leftarrow \pi_x + \pi_{f \to x}^{new} - \pi_{f \to x}$<br>$\tau_x^{new} \leftarrow \tau_x + \tau_{f \to x}^{new} - \tau_{f \to x}$<br>$a := \frac{1}{1 + c^2(\pi_y - \pi_{f \to y})}$ |
| 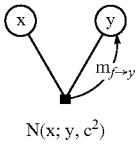<br>$N(x; y, c^2)$<br>See FIG. 13 | 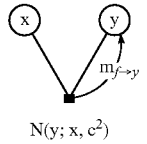<br>$N(y; x, c^2)$<br>See FIG. 13 |
| 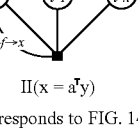<br>$\mathrm{II}(x = a^T y)$<br>Corresponds to FIG. 14 | $\pi_{f \to x}^{new} \leftarrow \left(\sum_{j=1}^{n} \frac{a_j^2}{\pi_{y_j} - \pi_{f \to y_j}}\right)^{-1}$<br>$\tau_{f \to x}^{new} \leftarrow \pi_{f \to x}^{new} \cdot \left(\sum_{j=1}^{n} a_j \cdot \frac{\tau_{y_j} - \tau_{f \to y_j}}{\pi_{y_j} - \pi_{f \to y_j}}\right)$<br>$\pi_x^{new} \leftarrow \pi_x + \pi_{f \to x}^{new} - \pi_{f \to x}$<br>$\tau_x^{new} \leftarrow \tau_x + \tau_{f \to x}^{new} - \tau_{f \to x}$ |
| 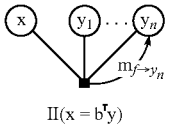<br>$\mathrm{II}(x = b^T y)$ $\;\;\;$ $\mathrm{II}(y_n = a^T[y_1, \ldots, y_{n-1}, x])$<br>Corresponds to FIG. 15 $\;\;\;$ Corresponds to FIG. 16 | $a = \frac{1}{b_n} \cdot \begin{bmatrix} -b_1 \\ \vdots \\ -b_{n-1} \\ +1 \end{bmatrix}$ |

In the case of the order factor nodes, the update equations are given in the following table.

Figure 17:
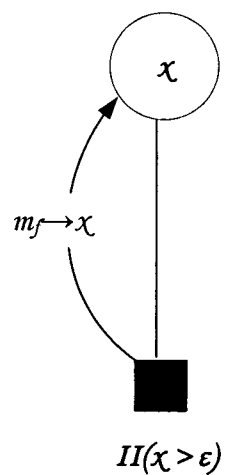
Figure 18:
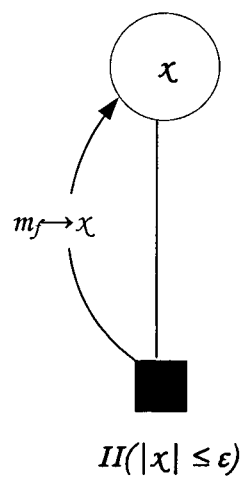

| Factor | Update equation |
|---|---|
| 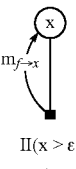<br>$\mathrm{II}(x > \varepsilon)$<br>Corresponds to FIG. 17 | $\pi_x^{new} \leftarrow \dfrac{c}{1 - w\left(\dfrac{d}{\sqrt{c}}, \varepsilon\sqrt{c}\right)}$<br><br>$\tau_x^{new} \leftarrow \dfrac{d + \sqrt{c} \cdot v\left(\dfrac{d}{\sqrt{c}}, \varepsilon\sqrt{c}\right)}{1 - w\left(\dfrac{d}{\sqrt{c}}, \varepsilon\sqrt{c}\right)}$<br><br>$\pi_{f \to x}^{new} \leftarrow \pi_{f \to x} + \pi_x^{new} - \pi_x$<br>$\tau_{f \to x}^{new} \leftarrow \tau_{f \to x} + \tau_x^{new} - \tau_x$<br>$c = \pi_x - \pi_{f \to x}, d = \tau_x - \tau_{f \to x}$ |
| 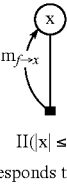<br>$\mathrm{II}(|x| \le \varepsilon)$<br>Corresponds to FIG. 18 | $\pi_x^{new} \leftarrow \dfrac{c}{1 - w_0\left(\dfrac{d}{\sqrt{c}}, \varepsilon\sqrt{c}\right)}$<br><br>$\tau_x^{new} \leftarrow \dfrac{d + \sqrt{c} \cdot v_0\left(\dfrac{d}{\sqrt{c}}, \varepsilon\sqrt{c}\right)}{1 - w_0\left(\dfrac{d}{\sqrt{c}}, \varepsilon\sqrt{c}\right)}$<br><br>$\pi_{f \to x}^{new} \leftarrow \pi_{f \to x} + \pi_x^{new} - \pi_x$<br>$\tau_{f \to x}^{new} \leftarrow \tau_{f \to x} + \tau_x^{new} - \tau_x$<br>$c = \pi_x - \pi_{m_x}, d = \tau_x - \tau_{m_m}$ |

In the update equations set out in the tables above a represents weightings which in a preferred example are set to 1. Examples of situations where the weights are not 1 are discussed below under the sub-heading partial play. Also, in the update equations v and w correspond to the functions v(.,.) and w(.,.) given by $$v(t, \alpha) = \frac{N(t - \alpha)}{\Phi(t - \alpha)}$$

$$w(t, \alpha) = v(t, \alpha) \cdot (v(t, \alpha) - (t - \alpha))$$

if the game ends in win and loss or $$v(t, \alpha) = \frac{N(-\alpha - t) - N(\alpha - t)}{\Phi(\alpha - t) - \Phi(-\alpha - t)}$$

$$w(t, \alpha) = v^2(t, \alpha) + \frac{(\alpha - t)N(\alpha - t) - (-\alpha - t)N(-\alpha - t)}{\Phi(\alpha - t) - \Phi(-\alpha - t)}$$

if the game ends in a draw. They were determined from the numerical approximation of a Gaussian and Gaussian cumulative distribution in the earlier implementation of TrueSkill without using message passing.

In the example shown in FIG. 9 the message passing during the chain schedule involves order factor node updates from the nodes in row 84 to the nodes in layer 83 using the update equation of the first row of the order factor node update equation table. In the case of a draw the modulus of the team performance difference is constrained to be less than or equal to a latent draw value ε and the update equation of the second row of the order factor node update equation table is used.

In the case of exact factor nodes, for message passing from a computation node (square node) to a single variable node (circular node) the update equations of the first row of the exact factor node update equation table is used. In the case of message passing from a computation node to two variable nodes the update equations of the second or third row of the table are used as appropriate. In the case of message passing from a computation node to three variable nodes the update equations of the fourth and fifth rows of that table are used as appropriate.

Partial Play

In the case of partial play, one or more of the players participates in the game for less than the duration of the game. In order to take this into account in updating our belief about the skill levels of the players weightings are used being the values a in the update equations specified above. Using information about the length of time each player participated in the game it is possible to set appropriate values of weights a for the players.

For example, in a game of two teams with two players each, the first player in the first team may have only participated 75% of the total game time. In this case, the corresponding a value would be 0.75 compared to 1.0 for the remaining other three players.

Partial Ranking

In the case that the outcome of a game only yields ranks for one or less than all the players (or teams) then we are able to take this into account by modifying the structure of the factor graph. For example, in a motor racing game only the ranks of the first, second and third participants may be known with any other players being unranked. Alternatively, the identity of the winner may be known but with no ranks provided for other players. In this case we modify the structure of the factor graph as illustrated, for a particular example, in FIG. 19.

Figure 19:
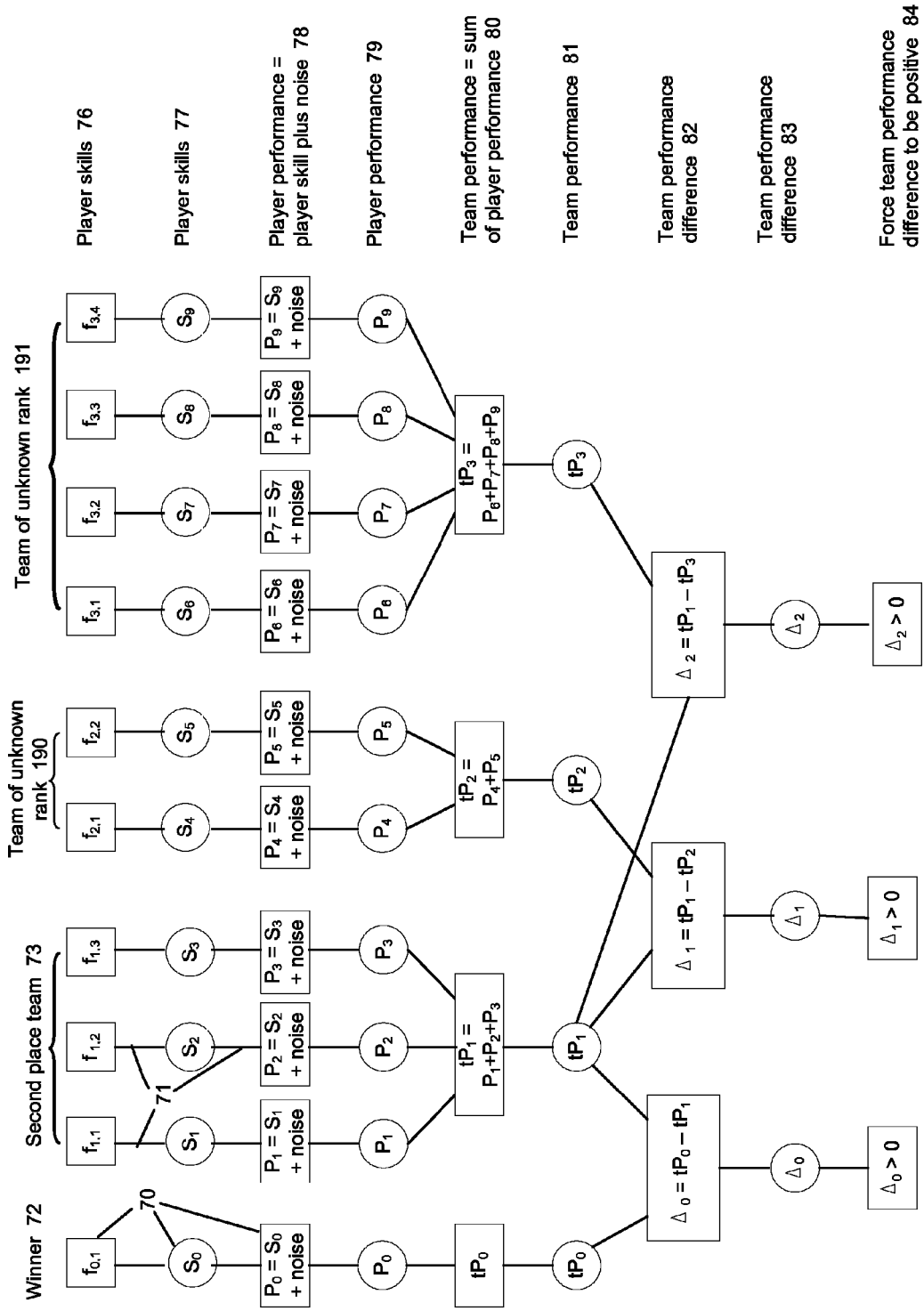
FIG. 19 shows the factor graph of FIG. 7 modified for partial ranking.

FIG. 19 illustrates the case where the winner and second place teams are known but the ranks of the remaining two teams 190, 191 are unknown. The factor graph is the same as that of FIG. 7 except that the team performance difference is calculated between the second place team and team 191 instead of between teams 190 and 191. Thus the factor graph comprises a link between a node associated with a team of known rank and each of the teams of unknown rank. In the example of FIG. 19 these correspond to node $tp_1$ in row 81 linking to each of nodes $\Delta_1$ and $\Delta_2$ in row 82.

Figure 20:
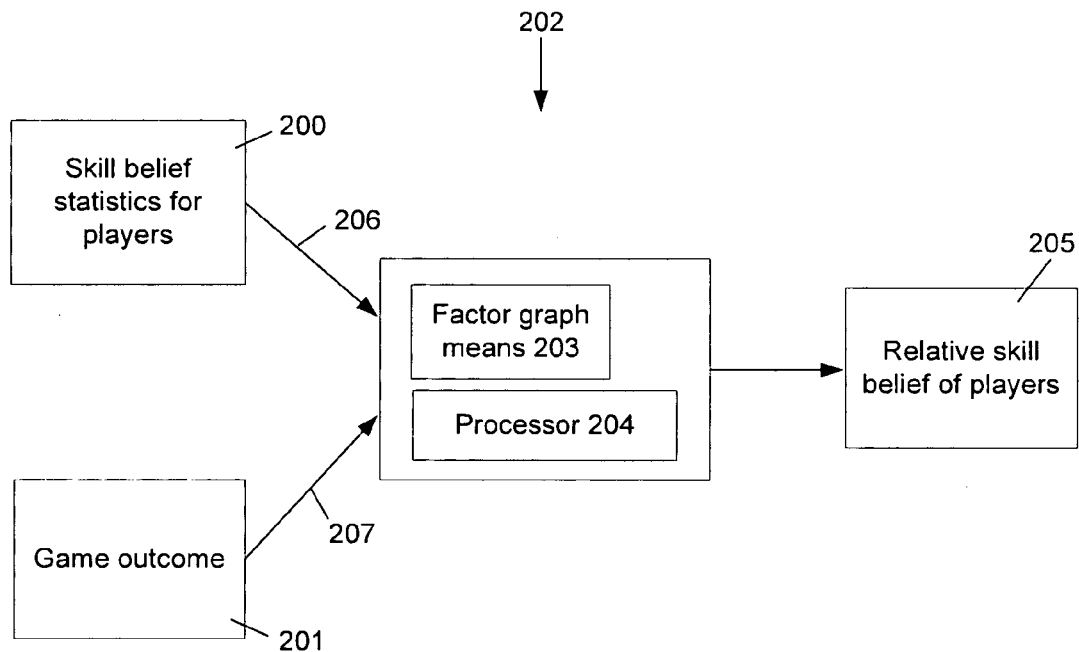
FIG. 20 is a schematic diagram of an apparatus for determining an indication of relative skill of players of a game.

Any suitable apparatus can be used to implement the methods described herein. For example, FIG. 20 is a schematic diagram of an apparatus for determining an indication of the relative skill of at least a first player and a second player of a game based on the outcome of one or more such games involving those players said apparatus comprising:

an input 206 arranged to access, for each player, statistics 200 describing a probability distribution associated with belief about skill of that player;

an input 207 arranged to receive information about the outcome 201 of one of the games;

means 203 for forming a factor graph comprising nodes, said graph being formed using the received information about the outcome, and instantiating at least some of the nodes with the statistics; and one or more processors 204 arranged to update the statistics associated with each player by using message passing techniques over the factor graph.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The use of message passing techniques adapted for use in computation of relative skill levels as described herein is particularly suited for distributed processing. This is because the processing associated with any particular factor node in the factor graph can be carried out at a given processor and the results passed to another independent processor which carries out computations associated with other nodes in the graph. Those independent processors may be connected over a communications network of any suitable type or may be integral with one another.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

The invention claimed is:

1. A method comprising:
   determining an indication of the relative skill of at least a first player and a second player of a game based at least in part on the outcome of one or more such games involving those players via operations comprising:
   (i) for each player, accessing statistics describing a probability distribution associated with belief about skill of that player;
   (ii) receiving information about the outcome of one of the games, the information comprising, for at least one player;
      ordered ranking information that indicates a relative finishing order of the players according to rules of the game and indicates performance for the player; and
      an indication of a length of time that the at least one player participated in the one of the games, the length of time being less than a total game time of the one of the games, the statistics for the at least one player being updated on the basis of the indication, the one of the games triggering a single update of the relative skill of the plurality of players participating in the one of the games, the single update including an update of the ranking of the at least one player based on the updated statistics; and
   (iii) forming a factor graph comprising nodes, said graph being formed using the received information about the outcome, and instantiating at least some of the nodes with the statistics; and
   updating the statistics associated with each player by using message passing techniques over the factor graph such that, for each player, the probability distribution indicating the belief about the skill of the player becomes based at least in part on the outcome of the game.

2. A method as claimed in claim 1, wherein the statistics comprise at least a mean and a variance describing each probability distribution.

3. A method as claimed in claim 1, wherein the probability distributions are Gaussian.

4. A method as claimed in claim 1, wherein the factor graph is acyclic.

5. A method as claimed in claim 1, wherein the message passing techniques applied over the factor graph are arranged to perform Bayesian inference processes.

6. A method as claimed in claim 1, wherein said factor graph comprises a plurality of groups of nodes, each group being associated with a particular player and comprising nodes linked in series.

7. A method as claimed in claim 6, wherein said factor graph comprises a plurality of second groups of nodes, each second group being associated with a team of players.

8. A method as claimed in claim 6, wherein said groups of nodes are linked with edges such that the order of the linking reflects the outcome of the game.

9. A method as claimed in claim 8, wherein said groups of nodes are also ordered in the factor graph on the basis of teams that the players are in.

10. A method as claimed in claim 1, for determining an indication of the relative skill of players from games involving three or more players.

11. A method as claimed in claim 1, wherein the length of time relative to the total game time is a weighting factor for updating the statistics.

12. A method as claimed in claim 1, wherein information about the outcome of the game comprises a partial ranking of players, said partial ranking comprising order information for at least one player and no order information among a plurality of other players, and wherein said factor graph is formed such that a link is created between a node associated with said at least one player and a node associated with each of the said other players.

13. An apparatus comprising:
   one or more processors arranged to determine an indication of the relative skill of at least a first player and a second player of a game based at least in part on the outcome of one or more such games involving those player via operations comprising:
   (i) an input arranged to access, for each player, statistics describing a probability distribution associated with belief about skill of that player;
   (ii) an input arranged to receive information about the outcome of one of the games, the information comprising, for at least one player, ordered ranking information that indicates a relative finishing order of the players according to rules of the game, and an indication of a length of time that the at least one player participated in the one of the games, the length of time being less than a total game time of the one of the games, the statistics for the at least one player being updated on the basis of the indication, the outcome of the one of the games being unknown for the at least one player until completion of the one of the games, the ranking of the at least one player being updated based on the updated statistics; and
   (iii) means for forming a factor graph comprising nodes, said graph being formed using the received information about the outcome, said means also being for instantiating at least some of the nodes with the statistics; and
   the one or more processors arranged to update the statistics associated with each player by using message passing techniques over the factor graph such that, for each player, the probability distribution indicating the belief about the skill of the player becomes based at least in part on the outcome of the game.

14. An apparatus as claimed in claim 13, wherein the factor graph is acyclic.

15. An apparatus as claimed in claim 13, wherein the message passing techniques applied over the factor graph are arranged to perform Bayesian inference processes.

16. An apparatus as claimed in claim 13, wherein said factor graph comprises a plurality of groups of nodes, each group being associated with a particular player and comprising nodes linked in series.

17. An apparatus as claimed in claim 13, wherein said factor graph comprises a plurality of groups of nodes, each group being associated with a team of players.

18. An apparatus as claimed in claim 16, wherein said groups of nodes are linked with edges such that the resulting order reflects the outcome of the game.

19. A method comprising:
receiving information about the outcome of a game, the information comprising, for at least one player, ordered ranking information that indicates a relative finishing order of one or more players according to rules of the game and indicates players' performance and an indication of a length of time that the at least one player participated in the game, the length of time being less than a total game time of the game, the game triggering a single update of skill levels of the plurality of players participating in the game, the single update including an update of the ranking of the at least one player based on the updated statistics;
forming an acyclic factor graph that includes:
  for each of a plurality of players of the game:
    a factor node that accesses a Gaussian distribution that represents a skill level of the player;
    a player skill variable node that stores mean and variance parameters of the Gaussian distribution;
    a factor node that reflects player performance by modifying the variance parameter based at least in part on the outcome of the game when the game has finished; and
    a player performance variable node that stores the mean and the modified variance parameter; and
  performance difference factor nodes for calculating performance differences between consecutive players, based at least in part on the ordered indication of players' performance; and
  for each of the plurality of players of the game, updating the Gaussian distribution that represents the skill level of the player, the Gaussian distribution for the at least one player being updated at least partly based on the indication.

20. A method as claimed in claim 19, wherein the acyclic factor graph further comprises:
a factor node that calculates a team performance by combining values from the player performance variable nodes of each player that is a member of the team; and
performance difference factor nodes for calculating performance differences between consecutive teams, based at least in part on an ordered indication of teams' performance.

* * * * *